W. A. DURRIN.
PICKET-STAKE.
No. 172,917. Patented Feb. 1, 1876.
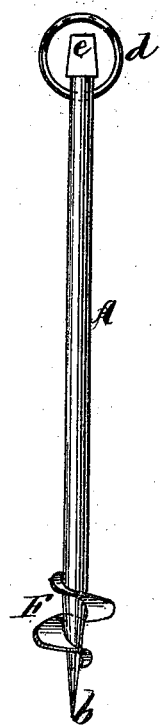
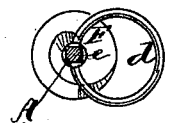

UNITED STATES PATENT OFFICE.

WARREN A. DURRIN, OF WILSON, WISCONSIN.

IMPROVEMENT IN PICKET-STAKES.

Specification forming part of Letters Patent No. 172,917, dated February 1, 1876; application filed November 30, 1875.

*To all whom it may concern:*

Be it known that I, WARREN A. DURRIN, of Wilson, St. Croix county, State of Wisconsin, have invented certain Improvements in Stakes, of which the following is a specification:

The object of my invention is to provide for an improved stake or anchor for picketing horses and other animals, and also for anchoring guy-ropes for tents, fences, scaffolds, &c.

My improved stake is easily screwed into the sod or soil, and, when screwed sufficiently deep down into the ground, will hold more secure than stakes simply driven into the ground.

My invention consists in constructing a strong iron rod with a point on the lower end and a ring inserted at the upper end. Near the lower end, and just above the point of the rod, is cast or forged thereto a flange in form of a screw, which, commencing near to the rod, increases in width as it approaches to the middle of its length, and then gradually diminishes in width until it loses itself in the rod.

The object of forming the flanged screw into this shape is to facilitate the screwing and unscrewing of the stake, and, at the same time, the wide center flange of the screw serves to hold the stake firmly into the ground, the soil pressing underneath and on the top of the broad flange.

The ring at the top of the rod serves both to turn the stake and to hold the guy-ropes.

If desired, the stake may also be turned by aid of a key or wrench fitting the square-formed top.

In order to describe my invention more fully, I refer to the accompanying drawing, forming a part of this specification.

Figure I is an elevation view of a stake embodying my invention. Fig. II is a top view of the same.

A is the rod with point *b* and ring *d* and square head *e*. F is the flange-shaped screw.

Having thus described my invention, I desire to claim—

A stake-rod for picketing horses or other animals, pointed at its lower end, and provided with a screw-flange commencing near the pointed end, increasing in width to the middle of its length, then decreasing in width until lost in the rod, substantially as described.

WARREN A. DURRIN.

Witnesses:
C. J. LESURE,
W. N. VILAS.